May 7, 1968      J. GOODMAN      3,382,184
PRODUCTION OF TRITIATED INORGANIC PHOSPHOR
Filed June 10, 1964
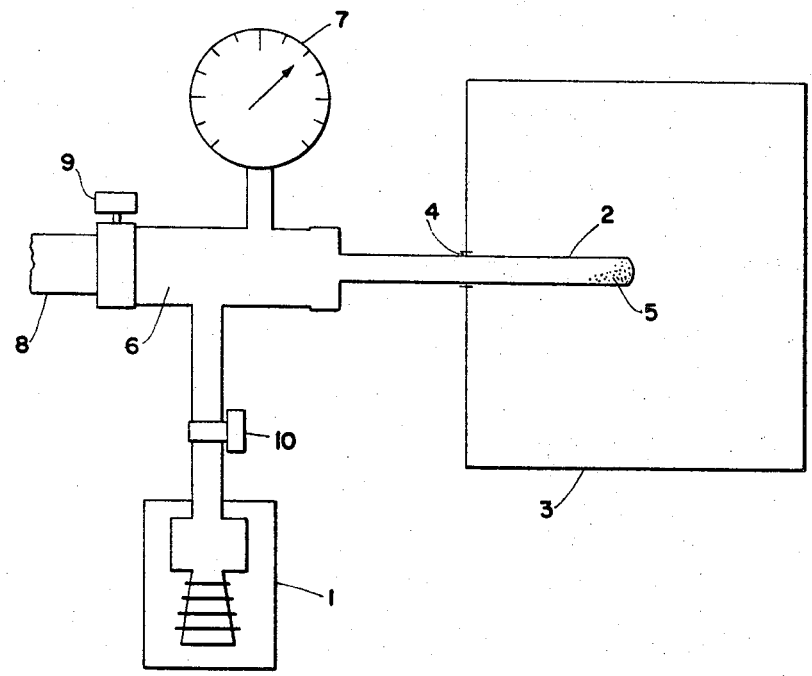
INVENTOR.
JEROME GOODMAN
BY *Amster & Rothstein*
ATTORNEY

United States Patent Office 3,382,184
Patented May 7, 1968

3,382,184
PRODUCTION OF TRITIATED INORGANIC PHOSPHOR
Jerome Goodman, New York, N.Y., assignor to NRA, Inc., Long Island City, N.Y., a corporation of New York
Filed June 10, 1964, Ser. No. 373,986
4 Claims. (Cl. 252—301.1)

This invention relates to self-luminescent material and more particularly to an improved self-luminescent material containing tritium and an improved method for making same.

It is well known that many materials both organic and inorganic can be caused to luminesce to a visually detectable extent under the influence of ionizing radiation. Inorganic phosphors in particular are characterized by such behavior and have been extensively employed in the commercial production of luminous coating materials of various types, such as required in the manufacture of watch dials and the like. It has been the practice in the past to coat the dials of watches with phosphor containing radium. The alpha rays emitted by the radium interact with the phosphor material thereby exciting the phosphor molecules to a luminescent state. Such an effect results when zinc sulfide for example, is mixed with radium. Radioactive strontium has also been mixed with inorganic phosphors of various types to provide artificial light sources of adequate luminosity. However, the use of either naturally occurring radium or the synthetic radioactive isotope strontium 90 creates a definite radiation hazard due to the exceedingly high penetrating activity of the corpuscular radiation emitted thereby. For example, when ingested by the body, both radium and strontium 90 have a tendency to lodge in the bony structure portions with their radiation emissions causing serious damage to surrounding tissue. Consequently, it is necessary to provide a considerable amount of protective, ray-impervious shielding during the preparation, handling and use of luminescent substances containing radium, strontium 90 and the like. The added cost attributable to the shielding requirement can, of course, be prohibitive.

A further limitation on the industrial use of both radium and strontium activated phosphor resides in the rate at which the phosphor material is destroyed by the densely ionizing particles emitted by both radium and strontium 90 during their radioactive decomposition. Luminosity diminutions of more than 50% per year are not unusual.

The foregoing problems have stimulated a search for radioactive substances which, while providing an adequate source of the betal radiation necessary for the required phosphor excitation, would eliminate substantially the disadvantage attendant upon the use of either radium or strontium 90. In this regard, the use of tritium, which is a radioactive hydrogen isotope of atomic weight 3, has been proposed. This material was found to create no appreciable health hazard. Furthermore, it has been found that the use of tritium not only produces a self-luminescent substance having a luminosity level considerably more constant over relatively protracted periods of time than can be obtained with either radium or strontium-activated phosphors, but in addition, its ready availability at relatively low cost makes its use particulary desirable.

However, the energy of the beta radiation emitted by tritium as compared to radium and strontium 90 is relatively low. Accordingly, when using tritium as the source of phosphor exciting radiation, it becomes very important to achieve a highly intimate contacting of tritium and phosphor materials in order to insure that a substantial portion of the available tritium activity is expended in the phosphor material thus inducing self-luminescence therein. A further problem is presented by the fact that tritium is a gas under normal conditions and consequently is not an easily manipulatable substance.

In an effort to cope with the above described problems, certain procedures have been proposed. One of these involves the conversion of tritium gas to a quasi solid form prior to its being associated with the inorganic phosphor. This is accomplished by tritiating an organic compound in such manner that the tirtium is incorporated directly into the organic molecule. The organic compound can be for example, a material selected from a class of compounds which includes alcohols and paraffinic acids having chain-lengths of 12–20 carbon atoms such as hexadecanol, stearic acid and the like. According to this method, the coating step is accomplished by suspending the inorganic phosphor in an organic solvent containing the required amounts of dissolved tritiated organic material. The solvent is driven off by evaporation leaving phosphor particles coated with tritiated organic material which are said to be useful as pigments in self-luminescent paint compositions.

According to yet another method, the tritium gas is first converted to quasi solid form by deposition upon a solid tritium-absorbing metal such as titanium or zirconium. The tritium-containing metal thus obtained is thereafter applied in finely divided for to the luminous particles.

However, a number of disadvantages are presented by either of the above described methods. Due to the low energy level of the beta radiation emitted by tritium, the relatively serious problem of effecting extremely intimate contacting of tritiated vehicle and phosphor material is presented. The penetration distance for a maximum energy tritium beta-ray (18-kilovolts) is 0.8 milligram per sq. centimeter, which is equivalent to a thickness of 0.008 millimeter of water or other material having a unit density of 1 gram per cubic centimeter. A very small percentage (approximately 5%) of the beta-rays emitted by tritium have energies in excess of 15 kilovolts, with the average beta-ray energy being relatively low and on the order of 5 to 7 kilovolts. It is accordingly readily apparent that the tritium-containing coating applied to the phosphor material must, of necessity, be extremely thin in order to avoid the spurious absorption of beta-rays to a significant extent by the coating material with corresponding diminution of phosphor luminosity. It has been estimated that for a coating thickness of 0.008 millimeter, only 10% of the energy of the tritium beta-rays would be expended in the phosphor with the rest being absorbed by the tritiated coating material. To mitigate this problem to an acceptable extent, it has been proposed to use coatings having thicknesses in the range of 0.0004–0.0008 millimeter. Such coatings present difficult problems of production and control but still lead to a maximum utilization of the beta-ray energy of only about 60–80%.

The foregoing problems and all variations presented thereby are substantially reduced or eliminated by the improved process and product forming the invention described and claimed herein.

It is a general object of this invention to provide an improved self-luminescent phosphor and an improved method for producing same which will not be subject to one or more of the above disadvantages and problems.

Another object of the invention is the provision of such a method which completely eliminates the use of intermediate vehicles of any kind as tritium carriers and the increased cost, handling and required chemical treatments incidental to both the synthesis and use of such intermediate vehicles.

A further object of the present invention is the provision of a self-luminescent phosphor whose luminosity level is appreciably more constant over extended periods of time than that characterizing phosphors produced according to methods heretofore proposed.

A still further object of the present invention is the provision of a self-luminescent phosphor material which has a relatively greater light output, i.e. luminosity level per unit of incorporated activity.

Other objects and many of the attendant advantages of the present invention will become more apparent as reference is made to the following detailed description taken together with the accompanying drawing.

The attainment of the foregoing objects is made possible by the present invention which comprises the step of directly contacting or impregnating an inorganic phosphor material preferably in fluid form, i.e. liquid or vapor, with gaseous tritium at elevated temperatures and for a time sufficient to produce a homogeneous molecular intermixture of inorganic phosphor material and tritium.

Particularly good results are obtained when the temperature employed approximates or exceeds that at which either sublimation or liquefaction of the phosphor material occurs under the conditions of the treatment. Where the phosphor material being tritiated is zinc sulfide, it has been found that temperatures of at least about 1200° C. when maintained for periods ranging from one hour to overnight are preferable to effect its sublimation. The tritiated phosphors obtained according to the invention show significantly improved luminosity values per unit of incorporated activity, especially when compared to the methods heretofore proposed. For example, it is not unusual to obtain efficient utilization of more than 80% of the available beta-ray energy emitted by the tritium gas. This is readily understandable since one of the outstanding features of the present invention resides in the complete elimination of any intermediate "tritium carrier" which characterizes the prior art methods discused previously. Accordingly, spurious absorption of the available beta-ray energy by any carrier material is likewise completely eliminated and the amount of tritium activity available for phosphor excitation is significantly increased. In addition, the process of this invention is per se supringsly more economical, efficient, and/or susceptible of precise control as compared with previously employed processes.

The phosphor materials which can be used in the process described herein are those inorganic phosphors which are in general those capable of being excited to luminescence i.e., fluorescence or phaophorescence by cathode rays. Exemplary but by no means exhaustive of suitable phosphor materials are the following: zinc sulfide, cadmium sulfide, zinc orthosilicate; zinc cadmium sulfide, zinc orthogermanate, zinc phosphate, etc. and mixtures of two or more of the foregoing, activated with silver, copper or manganese or the like in known manner in amounts approximating one percent or less by weight.

All commercially available fired or unfired inorganic phosphors which generally have an average diameter of between 1 and 7 microns (0.001–0.007 mm.) are operative. Although particle sizes up to and exceeding 10 microns may be used, it has been found that the smaller particles sizes having an average maximum diameter of 3 microns or less are particularly effective. However, it should be realized that due to the increased efficiency attending the conversion of beta-ray energy to visible light, and an intimate molecular contact between phosphor and tritium made possible by the preferred embodiments of the present invention, the significance of the particle size factor therein as an influence on the efficacy of the tritium treatment is correspondingly diminished. As will be made clear by the examples which follow hereinbelow, the phosphor particle sizes can be further advantageously reduced to facilitate vaporization, sublimation and/or liquefaction of phosphor, and more intimate molecular contact between tritum and phosphor.

One of the preferred embodiments for producing the novel self-luminescent material of the present invention involves the use of those phosphor materials which undergo sublimation on heating. According to this embodiment, such a phosphor material is heated at or above its sublimation temperature in an atmosphere of tritium, for a time sufficient to convert the solid phosphor to vapor form. The temperatures employed can range substantially above the sublimation temperature for the particular phosphor being treated.

However, due to the cost of high temperature equipment, which can, of course, be prohibitive, it is usually advisable from an economic standpoint to employ temperatures not substantially exceeding those required for phosphor sublimation. Again, however, it should be understood that temperatures up to and exceeding 2000° C. could be employed without in any way detracting from the results provided by the present invention. The heating is maintained for the period required for effecting substantial homogenous molecular intermixing of tritium and phosphor vapor whereupon the heating is discontinued and the temperature is allowed to cool to a point at which condensation of phosphor to solid form occurs. By condensing the phosphor vapor in the presence of tritium, in this manner, there is obtained a highly tritiated phosphor material in which the tritum is homogeneously dispersed throughout the entire phosphor particle mass.

The above procedure can also be carried out in the presence of a surface which is desired to be made light-producing by the application of a self-luminescent coating thereto. Accordingly, by causing the homogeneous molecular intermixture of tritium gas and vaporized phosphor to condense upon such a suface, a kind of "in situ" coating operation is effected. Moreover, by the use of appropriate stencils, various designs, patterns, characters, intelligence information and ornamental effects, continuous and/or discontinuous, can be laid down in the form of self-luminescent phosphor.

A second preferred embodiment for carrying out the present invention and by which novel self-luminescent materials are obtained relates to those phosphor materials which exhibit a liquid phase on heating. According to this method, the phosphor material is heated at or above its melting point in order to convert the solid phosphor to molten liquid form. The tritation step may be accomplished by bubbling and/or diffusing the tritium gas into the mass of molten phosphor, although other well known methods for effecting highly intimate gas-liquid contacting, preferably with agitation, can be employed.

Heating of the molten phosphor mass is continued for the period required for effecting thorough molecular intermixing of phosphor and tritium whereupon the hot melt can be cooled to a point at which solidification of the phosphor mass occurs. The phosphor material thus obtained can be reduced to the desired particle size in any desired manner. Alternatively, the liquid tritiated phosphor mass is available directly for use in hot melt coating operations. The laying down of patterns, designs, etc., as mentioned above in connection with the "sublimation" procedure can thus be readily accomplished.

Moreover, depending upon the operating parameters employed, vaporization of the molten phosphor can occur to a significant extent. In fact, it may be desired to substantially or completely vaporize the molten phosphor and to proceed with the tritiation and/or condensation steps according to the procedure described for the sublimation treatment. It thus becomes possible to carry out "in situ" coating operations with such phosphors by carrying out the condensation step at temperatures at which liquefaction and solidification of phosphor occur substantially simultaneously. Furthermore, where the phosphor is present in both liquid and vapor phases, the desired tritiation can be carried out by bringing the tritium into contact with both phases. This can occur inherently since a portion of the tritium gas introduced into the molten phosphor mass will inevitably enter any vapor space situated above the phosphor melt. In any event, the tritium can be introduced directly into each of the phosphor phases should the necessity arise.

According to yet another embodiment of the present invention, a phosphor tritiation treatment is carried out within a temperature range of about 200 centigrade degrees, said range having as its maximum the fluidization point, i.e., sublimation or liquefaction temperature for the particular phosphor material being treated. Particularly good results are obtained in terms of tritium takeup and/or phosphor luminescence when the particle size of the phosphor material is extremely fine. These sizes can range from an average diameter of about 3 microns, and particularly less than 1 micron, down to about .01 micron and less. The size reduction can be accomplished by the use of appropriate conventional size reduction equipment. Contact between the tritium and the finely divided particles of phosphor material according to this embodiment may be carried out in any desired manner. Thus, as in the examples below, contact can be made in batchwise, static manner by merely introducing the tritium gas into a chamber containing the particulate phosphor material at a temperature within the aforementioned range of up to 200 centigrade degrees below the liquefaction or sublimation temperature of the phosphor, i.e., the highest 200 centigrade degree range at which the phosphor material remains solid for a sufficient time to permit thorough penetration of the tritium into the powdered phosphor material and intimate contact with all the phosphor particles therein. Alternatively, contact may be more or less continuous by passing the tritium, horizontally or vertically, through the heated reaction or treating chamber or conduit concurrent or countercurrent to the flow of solid particles of phosphor material, preferably by the fluidized bed technique with said particles held in suspension by an upward, recycled current of tritium gas. Any absorbed water vapor and/or gases etc. which might be present in the phosphor material can be driven off by heating the phosphor in vacuo at a temperature ranging from 100 to 850° C.

Although the temperatures employed in the above description generally range from about 1000° C.—1250° C, as pointed out previously, higher temperatures could just as easily be used and, in fact, may be required. For example, while a temperature range of at least about 1200°–1300° C. has been found advisable to effect sublimation of zinc sulfide phosphor, temperatures in the neighborhood of 1,000° C. are adequate for subliming cadmium sulfide phosphor. The pressures employed are not critical and can range from vacuum to atmospheric and above. The process is readily adapted for batchwise or continuous operation.

FIG. 1 in the attached drawing is a schematic representation of the apparatus employed in carrying out the examples, although it will be understood that many other means and apparatus systems will become obvious to skilled workers and may be employed in carrying out the various embodiments of this invention. Following is a description of the procedure employed in the examples, reference numerals identifying similarly identified parts shown in the drawing.

Approximately 5 grams of phosphor material 5 is inserted into a ceramic (alumina) tube or chamber 2 of relatively small internal volume, which tube extends through aperture 4 into a heating oven 3. The open end of said tube is connected to a cross-joint 6 provided with a vacuum-pressure gauge 7. With tritide trap valve 10 closed, vacuum line valve 9 is opened connecting vacuum line 8 to the cross-joint, and the system evacuated down to negligible positive pressure, i.e. high vacuum conditions, if desired with simultaneous application of heat in the oven to drive off moisture. Trap valve 10 is then opened, vacuum line valve 9 closed, and the uranium tritide trap 1 is subjected to moderate heating to initiate thermal generation of tritium gas and to fill the system with the gas to a pressure of about ⅓ atmosphere (10″ Hg). Trap valve 10 is then closed (effective internal volume of system consisting of tube 2, cross-joint 6 and pressure gauge 7 is 40–45 cc.) and the heating oven 3 turned on to heat the phosphor material in contact with the tritium gas at the predetermined temperatures and durations.

The following examples are only illustrative of this invention and are not to be regarded as limitative. All parts and proportions referred to herein and in the appended claims are by weight unless otherwise indicated.

EXAMPLE I

Employing the procedure and apparatus described above and in the attached drawing copper-activated zinc sulfide phosphor powder having an average particle size of 1–3 microns is subjected to treatment with tritium gas at a temperature of about 1050° C. for about 2½ hours. The treated phosphor displays a small amount of self-luminescence, indicating some absorption of tritium by the phosphor although substantially no change in the tritium pressure is observed during the treatment. A similar treatment at room temperature results in a product having no self-luminescence.

EXAMPLE II

The procedure outlined in Example I is repeated except that an oven temperature of 1100° C. is maintained. The results obtained are similar to those of Example I.

EXAMPLE III

The procedure outlined in Example I is repeated except that the oven temperature is increased to 1150° C. Again, the results obtained are similar to those of the previous examples.

EXAMPLES IV–VI

Examples I–III are repeated except that the heating time is increased to four hours. The results are similar to those obtained in Examples I–III with perhaps a slight increase in the amount of tritium absorbed by the zinc sulfide phosphors as indicated by a very small pressure change. The tritium absorption for each of the foregoing examples is calculated to be about 0.2–0.8 curie with slight increases noted for the higher temperatures and/or durations.

The following examples illustrate the substantially improved luminosity results which are obtained when the temperatures employed approximate or exceed those at which sublimation of the zinc sulfide occurs.

EXAMPLE VII

The procedure outlined in Example I is repeated except for the time-temperature parameters. In this example, the zinc sulfide is heated to a temperature of 1200° C. for a period of one hour. A distinctly noticeable pressure change is observed indicating that significant quantities of tritium are being absorbed by the zinc sulfide.

EXAMPLE VIII

Example VII is repeated except that the heating period is increased to two hours. A still further change in pressure is observed indicating increased tritium absorption by the zinc sulfide.

EXAMPLE IX

Example VII is repeated except that the heating period is increased to three hours. The results are similar to those observed for Examples VII and VIII thus confirming the previously noted trend toward significantly increased absorption of tritium by zinc sulfide phosphors for increased values of time and/or temperature.

EXAMPLES X TO XII

Examples VII through IX are repeated except that the temperature is increased to 1250° C. Again, the observed change in pressure indicates substantial tritium absorption by the zinc sulfide.

In each of the Examples VII–XII, sublimation of the zinc sulfide in its ceramic tube container occurs yielding areas of bright green wherever vaporized zinc sulfide has condensed. These condensed zinc sulfide phosphor portions display higher levels of induced self-activation i.e., self-luminescence, when compared to those zinc sulfide portions which have not undergone sublimation. Luminosity measurement with respect to these condensed phosphor portions give brightness values therefor on the order of 10 microlamberts.

Other samples of zinc sulfide are similarly treated at temperatures of 1200° C. and higher. However, the heating periods are extended and range from three hours to overnight. The combined effect of high temperatures and extended heating periods are even more promotive of greater phosphor light out-puts per unit of incorporated activity.

Without intending to be bound by any theory, it appears that the significantly enhanced luminosity values found to characterize those portions of the zinc sulfide materials which have undergone sublimation and, in turn, condensation, are no doubt due in large part to the highly efficient method of contacting the vaporized phosphors and tritium gas to achieve a molecular intermixture thereof according to the present invention. Of further significance is the fact that the tritium is absorbed into the newly forming surfaces of the condensing zinc sulfide, thereby producing a self-luminescent phosphor material in which the tritium is homogeneously distributed throughout the entire phosphor particle mass. As has been mentioned previously, the fact that the use of an intermediate material as a tritium carrier is completely eliminated and that there is intimate contact between the tritium and he phosphor in which it is incorporated to a great extent accounts for the substantially improved results made possible by the present invention. It is also quite possible that volatile intermediates generated in the course of the high temperature treatment, such as zinc tritide and/or tritium sulfide etc., play a significant part.

The following examples illustrate the effects of phosphor particle size.

Examples I–VI are repeated except that the average particle size of the zinc sulfide is further reduced in known manner to about 0.1 micron. In no case does sublimation of the zinc sulfide phosphor occur. The luminosity results obtained are not only somewhat improved over those obtained for Examples I–VI in which the phosphor particle size is considerably greater but almost equal those observed for Examples VII–XII in which phosphor sublimation occurs. It would thus appear that the increase in the available zinc sulfide phosphor surface area resulting from the smaller particle size tends to increase the amount of tritium absorbed by the zinc sulfide and consequently the degree of self-luminescence induced therein.

The results described in the above examples can be obtained according to the novel process of this invention whether the inorganic phosphor be of the so-called "fired" or "unfired" type. The term "fired" in the context of this invention refers to the high temperature pre-heating of the phosphor material in the presence of either air or tritium. For example, in the case of zinc sulfide, the firing temperature is of the order of 1150°–1200° C. Any water vapor and/or absorbed gases such as air which might be present in the inorganic phosphor material as a result of high temperature firing in air can easily be removed by heating the phosphor in vacuo at temperatures ranging from 100°–850° C.

It has been observed that the fired and unfired phosphor materials differ somewhat as regards their respective tritium absorption and self-luminescence characteristics. In particular, again referring to zinc sulfide, the whitish unfired form seems to take up the tritium more readily than the fired greenish form. This may possibly be due in part to the somewhat greater porosity characterizing the unfired zinc sulfide phosphors. On the other hand, unfired zinc sulfide material is essentially non-luminescent. However, these distinctions largely disappear and resulting phosphor becomes fired when the tritium treatment is carried out according to the process described in the foregoing examples and especially when carrying out the process at those conditions leading to sublimation of the phosphor material as described in Examples VII–XII.

As pointed out previously, the apparatus required for carrying out the novel process of this invention may take many forms and is not to be limited to the particular arrangement illustrated in the accompanying drawing. Essentially, the apparatus required need only provide means for removing air from the system by flushing with a non-reactive gas, or preferably by producing vacuum pressure conditions within the system, as for example with a vacuum pump, or both; suitable container means for the inorganic phosphor material being subjected to the tritium treatment as for example, a ceramic (alumina) or quartz tube, the former having been found to be somewhat more preferable due to its greater durability; heating means as for example, an oven adapted to accommodate the phosphor container means therewithin; and a source of tritium.

The phosphor materials obtained as a result of the process described in the foregoing examples can be used in any of the industrial applications which exist for self-luminescent materials. For example, they can be added to self-luminescent paint compositions such as those described in U.S. Patent 3,033,797. This is a particularly advantageous use of the self-luminescent substances described herein since the necessity of forming an intermediate tritiated vehicle such as the tritiated plastic binder or tritiated plasticizer as required in the patent referred to is completely eliminated.

The novel process of the present invention and the products resulting therefrom are also highly useful in the self-luminous coatings industry. Application of a luminescent layer to a surface desired to be made light-producing can be accomplished according to the present invention by causing a vapor mixture of tritium gas and phosphor vapor to desposit, as by condensation, upon the particular material to be coated therewith. Where the phosphor material is one which undergoes sublimation, the solid phosphor material can be converted directly to vapor form by maintaining a temperature which approximates or exceeds the sublimation temperature of the particular phosphor. Vaporization of phosphor material which exhibits a liquid phase on heating can, of course, be obtained by using a temperature which approximates or exceeds the boiling point of the liquid phosphor.

The surfaces being coated can be flat, three-dimensional or otherwise irregular and accordingly comprehend such items as buttons, discs, cylinders, etc. For example, luminous personnel markers currently in use by the military services could be readily produced according to the process described herein. This could be accomplished for example by merely placing the surface to be coated in the phosphor vaporization chamber containing the phosphor material or in a separate chamber which communicates therewith and allowing the tritiated phosphor vapors to condense thereon. Furthermore, although the illustrative examples have been described with reference to batch or non-continuous type processing, it is clear that the present invention could readily be carried out in continuous fashion.

This invention has been disclosed with respect to certain preferred embodiments, and it will be understood that various modifications and variations thereof will become obvious to persons skilled in the art and are to be included within the spirit and purview of this invention and application and the scope of the appended claims.

What is claimed is:
1. A process comprising
   (1) heating, under substantially anhydrous conditions, and inorganic phosphor material above its sublimation temperature,
   (2) intimately mixing the resulting phosphor vapor with a material consisting essentially of tritium gas at a temperature above said sublimation temperature, and
   (3) condensing the resulting mixture.
2. A process as defined in claim 1 wherein said phosphor material is activated zinc sulfide.
3. A process as defined in claim 1 wherein said condensation is carried out on a surface to be made light-producing.
4. The product of the process of claim 1.

References Cited
FOREIGN PATENTS

| | | |
|---|---|---|
| 1,269,065 | 7/1961 | France. |
| 869,698 | 6/1961 | Great Britain. |

BENJAMIN R. PADGETT, *Primary Examiner.*

CARL D. QUARFORTH, *Examiner.*

L. A. SEBASTIAN, *Assistant Examiner.*